(12) United States Patent
Claydon et al.

(10) Patent No.: US 7,996,652 B2
(45) Date of Patent: Aug. 9, 2011

(54) PROCESSOR ARCHITECTURE WITH SWITCH MATRICES FOR TRANSFERRING DATA ALONG BUSES

(76) Inventors: Anthony Peter John Claydon, Bath (GB); Anne Patricia Claydon, Bath (GB)

( * ) Notice: Subject to any disclaimer, the term of this patent is extended or adjusted under 35 U.S.C. 154(b) by 411 days.

(21) Appl. No.: 12/070,790

(22) Filed: Feb. 21, 2008

(65) Prior Publication Data

US 2008/0222339 A1 Sep. 11, 2008

(51) Int. Cl.
*G06F 9/00* (2006.01)
(52) U.S. Cl. ......................................................... 712/18
(58) Field of Classification Search ..................... 712/18
See application file for complete search history.

(56) References Cited

U.S. PATENT DOCUMENTS

| | | | |
|---|---|---|---|
| 4,974,190 A | 11/1990 | Curtis | |
| 5,241,491 A | 8/1993 | Carlstedt | |
| 5,408,676 A | 4/1995 | Mori | |
| 5,826,049 A | * | 10/1998 | Ogata et al. .................. 710/317 |

FOREIGN PATENT DOCUMENTS

| | | |
|---|---|---|
| EP | 0492174 | 7/1992 |
| WO | PCT/US89/04281 | 4/1990 |
| WO | WO 91/11770 | 8/1991 |

OTHER PUBLICATIONS

Schmidt, Ulrich et al., "Datawave: A Single-Chip Multiprocessor for Video Applications", IEEE Micro—Jun. 1991 (pp. 22-25, 88-94), USA.
Shigei, Noritaka et al., "On Efficient Spare Arrangements and an Algorithm with Relocating Spares for Reconfiguring Processor Arrays", IEICE Trans. Fundamentals, Jun. 1997.
Reiner Hartenstein et al., on Reconfigurable Co-Processing Units, Proceedings of Reconfigurable Architectures Workshop (RAW98), Mar. 30, 1998.
Int'l Search Report dated Jun. 16, 2003.
Int'l Preliminary Examination Report dated Jul. 14, 2003.

* cited by examiner

*Primary Examiner* — Alford W Kindred
*Assistant Examiner* — Benjamin P Geib
(74) *Attorney, Agent, or Firm* — Potomac Patent Group PLLC

(57) ABSTRACT

A processor architecture includes a plurality of elements arranged in an array of rows and columns and a plurality of first and second bus pairs with the first pair being located between different adjacent rows of the array and having first and second buses running in opposite directions and the second bus pair being located between different adjacent columns of the array and having third and fourth buses running in opposite directions and intersecting the first and second buses. A plurality of switch matrices located at an intersection of one of the first bus pairs and one of the second bus pairs includes inputs and outputs for first, second, third and fourth buses and switch elements for switchably connecting the inputs and outputs.

25 Claims, 11 Drawing Sheets

| ADDRESS | FUNCTION | DATA |
|---|---|---|
| 16 BITS | 16 BITS | 32 BITS |

PROCESSOR ARCHITECTURE WITH SWITCH MATRICES FOR TRANSFERRING DATA ALONG BUSES

This application claims priority from U.S. patent application Ser. No. 10/450,618 filed on Nov. 21, 2003 (which claims priority from British Patent Application No. 0030993.0 filed on Dec. 19, 2000). The subject matter of these applications are herein incorporated in their entirety by reference.

This invention relates to a processor architecture, and in particular to an architecture which can be used in a wide range of devices, such as communications devices operating under different standards.

In the field of digital communications, there has been a trend to move as many functions as possible from the analogue domain into the digital domain. This has been driven by the benefits of increased reliability, ease of manufacture and better performance achievable from digital circuits, as well as the ever decreasing cost of CMOS integrated circuits. Today, the Analogue-Digital and Digital-Analogue Converters (ADC's and DAC's) have been pushed almost as near to the antenna as possible, with digital processing now accounting for parts of the Intermediate Frequency (IF) processing as well as baseband processing.

At the same time, there has been a vast improvement in the capability of microprocessors, and much of the processing for many narrowband communications systems is now performed in software, an example being the prevalence of software modems in PC's and consumer electronics equipment, partly because a general purpose processor with sufficient processing power is already present in the system. In the field of wireless communications there is extensive research in the field of software radio, the physical layers of broadband communications systems require vast amounts of processing power, and the ability to implement a true software radio for third generation (3G) mobile communications, for example, is beyond the capability of today's DSP processors, even when they are dedicated to the task.

Despite this, there has never been a time when there has been more need for software radio. When second generation (2G) mobile phones were introduced, their operation was limited to a particular country or region. Also, the major market was business users and a premium could be commanded for handsets. Today, despite diverse 2G standards in the USA and different frequency bands, regional and international roaming is available and handset manufacturers are selling dual and triple band phones which are manufactured in their tens of millions. After years of attempts to make an international standard for 3G mobile, the situation has now arisen where there are three different air interfaces, with the one due to replace GSM (UMTS) having both Frequency and Time Division Duplex (FDD and TDD) options. Additionally, particularly in the USA, 3G systems must be capable of supporting a number of legacy 2G systems.

Although a number of DSP processors are currently being developed that may be able to address the computational requirements of a 3G air interface, none of these show promise of being able to meet the requirements of a handset without the use of a number of hardware peripherals. The reasons for this are power and cost and size. All three are interrelated and controlled by the following factors:

1. The need for memory. Classical processor architectures require memory to store both the program and data which is being processed. Even in parallel Very Long Instruction Word (VLIW) or Single Instruction Multiple Data (SIMD) architectures, the entire processor is devoted to one task at a time (eg: a filter, FFT or Viterbi decoding), with memory required to hold intermediate results between the tasks. In addition, fast local instruction and data caches are required. Altogether, this increases the size and cost of the solution, as well as dissipating power. In hardwired architectures, data is usually transferred directly from one functional block to another, with each block performing DSP functions on the data as it passes through, thus minimising the amount of memory required.

2. Data bandwidth. In hard-wired solutions, all data is held locally, if necessary in small local RAM's within functional blocks. Some transceivers may contains several dozen small RAM's, and although the data bandwidth required by each RAM may be relatively small, the overall data bandwidth can be vast. When the same functions are implemented in software running on a processor, the same global memories are used for all data and the required data bandwidth is enormous. Solutions to this problem usually involve the introduction of local memories in a multi-processor array, but the duplication of data on different processors and the task of transferring data between processors via Direct Memory Access (DMA) mean that the power dissipation is, if anything, increased, as is silicon area and consequently cost.

3. The need for raw processing power. In today's DSP processors, improvements in processing throughput are achieved by a combination of smaller manufacturing process geometries, pipelining and the addition of more execution units (e.g. arithmetic logic units and multiplier-accumulators). Improvements in manufacturing processes are open to all solutions, and so are not a particular advantage for conventional DSP processors. The other two methods both come with considerable overheads in increased area and power, not merely because of the extra hardware which provides the performance improvement, but because of the consequential increases in control complexity.

The processor architecture of the present invention falls under the broad category of what are sometimes referred to as dataflow architectures, but with some key differences which address the needs of software. In fact, the invention provides a solution which is more akin to a hard-wired architecture than a DSP processor, with consequential size and power advantages. It consists of an array of processor and memory elements connected by switch matrices.

According to the present invention, there is provided a processor architecture, comprising:

a plurality of first bus pairs, each first bus pair including a respective first bus running in a first direction (for example, left to right) and a respective second bus running in a second direction is opposite to the first direction (for example right to left);

a plurality of second bus pairs, each second bus pair including a respective third bus running in a third direction (for example downwards) and a respective fourth bus running in a fourth direction opposite to the third direction (for example upwards), the third and fourth buses intersecting the first and second buses;

a plurality of switch matrices, each switch matrix located at an intersection of a first and a second pair of buses;

a plurality of elements arranged in an array, each element being arranged to receive data from a respective first or second bus, and transfer data to a respective first or second bus.

Preferably, the elements in the array include processing elements, for operating on received data, and memory elements, for storing received data.

Preferably, the processing elements include Arithmetic Logic Units and/or Multiplier Accumulators.

Preferably, the elements in the array further include interface elements for receiving input data from outside the processor, and transferring output data outside the processor.

Preferably, each element of the array is connected between a first bus of one first bus pair and a second bus of an adjacent first bus pair, and has: a first input for receiving data from the first bus of the one first bus pair; a first output for transferring data to the first bus of the one first bus pair; a second input for receiving data from a second bus of the adjacent first bus pair; and a second output for transferring data to the second bus of the adjacent first bus pair.

Preferably, each switch matrix allows data on a bus of a first bus pair to be switched onto the other bus of said first bus pair and/or onto either bus or both buses of the respective intersecting second bus pair, and allows data on a bus of a second bus pair to be switched onto either bus or both buses of the respective intersecting first bus pair, but not onto the other bus of said second bus pair.

Preferably, there are a plurality of array elements (most preferably, four) connected to each bus of a first bus pair between each pair of adjacent switch matrices.

The architecture according to the preferred embodiment of the invention has the advantage that no global memory is required, which provides a major benefit in terms of power consumption.

The architecture allows flexible data routing between array elements using a switch matrix. This means that the device is able to run the many diverse algorithms required by a software radio concurrently, without having to reconfigure the array.

Further, data is passed from one array element to another directly, without having to be written to memory. This means that memory requirements are close to being as low as those of a hardwired architecture.

Moreover, because there are a large number of simple array elements, each performing a limited number of operations, there is a low control overhead, reducing size and power dissipation.

Reference will now be made, by way of example, to the accompanying drawings, in which:

FIG. 1 shows a part of the structure of a processor architecture 10. The device is made up of an array of elements 20, which are connected by buses and switches.

Figure 1:
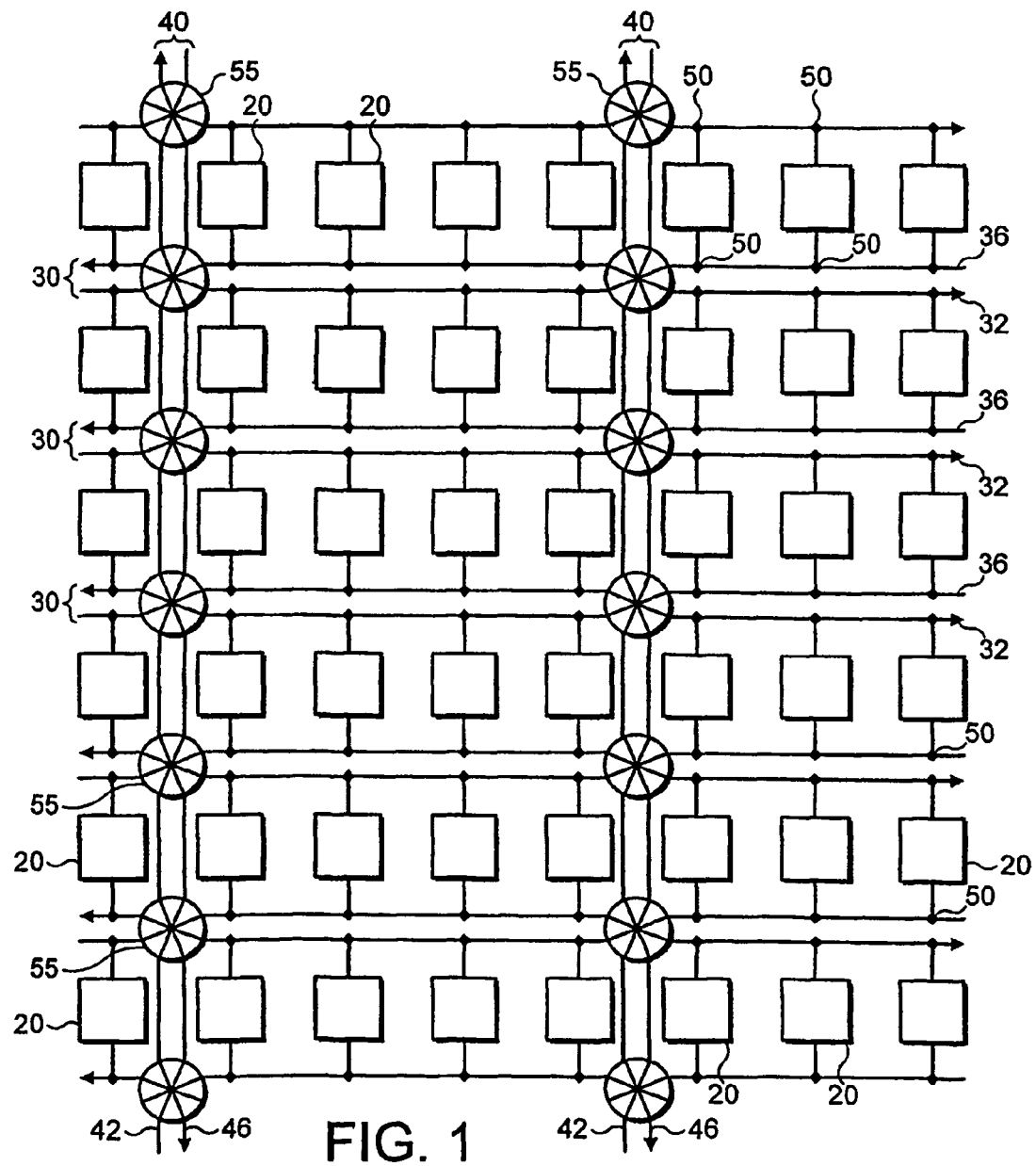
FIG. 1 is a schematic representation of a section of a processor, illustrating the architecture in accordance with the invention.

The architecture includes first bus pairs 30, shown running horizontally in FIG. 1, each pair including a respective first bus 32 carrying data from left to right in FIG. 1 and a respective second bus 36 carrying data from right to left.

The architecture also includes second bus pairs 40, shown running vertically in FIG. 1, each pair including a respective third bus 42 shown carrying data upwards in FIG. 1 and a respective fourth bus 46 shown carrying data downwards in FIG. 1.

In FIG. 1, each diamond connection 50 represents a switch, which connects an array element 20 to a respective bus 32, 36. The array further includes a switch matrix 55 at each intersection of a first and second bus pair 30, 40.

The data buses are described herein as 64-bit buses, but for some application areas it is likely that 32-bit buses will suffice. Each array element can be designed to be any one of the following:

an execution array element, which contains an Arithmetic Logic Unit (ALU) or Multiplier Accumulator (MAC);

a memory array element, containing a RAM;

an interface array element, which connects the processor to an external device; or a switch control array element, which controls the operation of at least one switch matrix 55.

Each of these will be described in more detail below.

Figure 2:
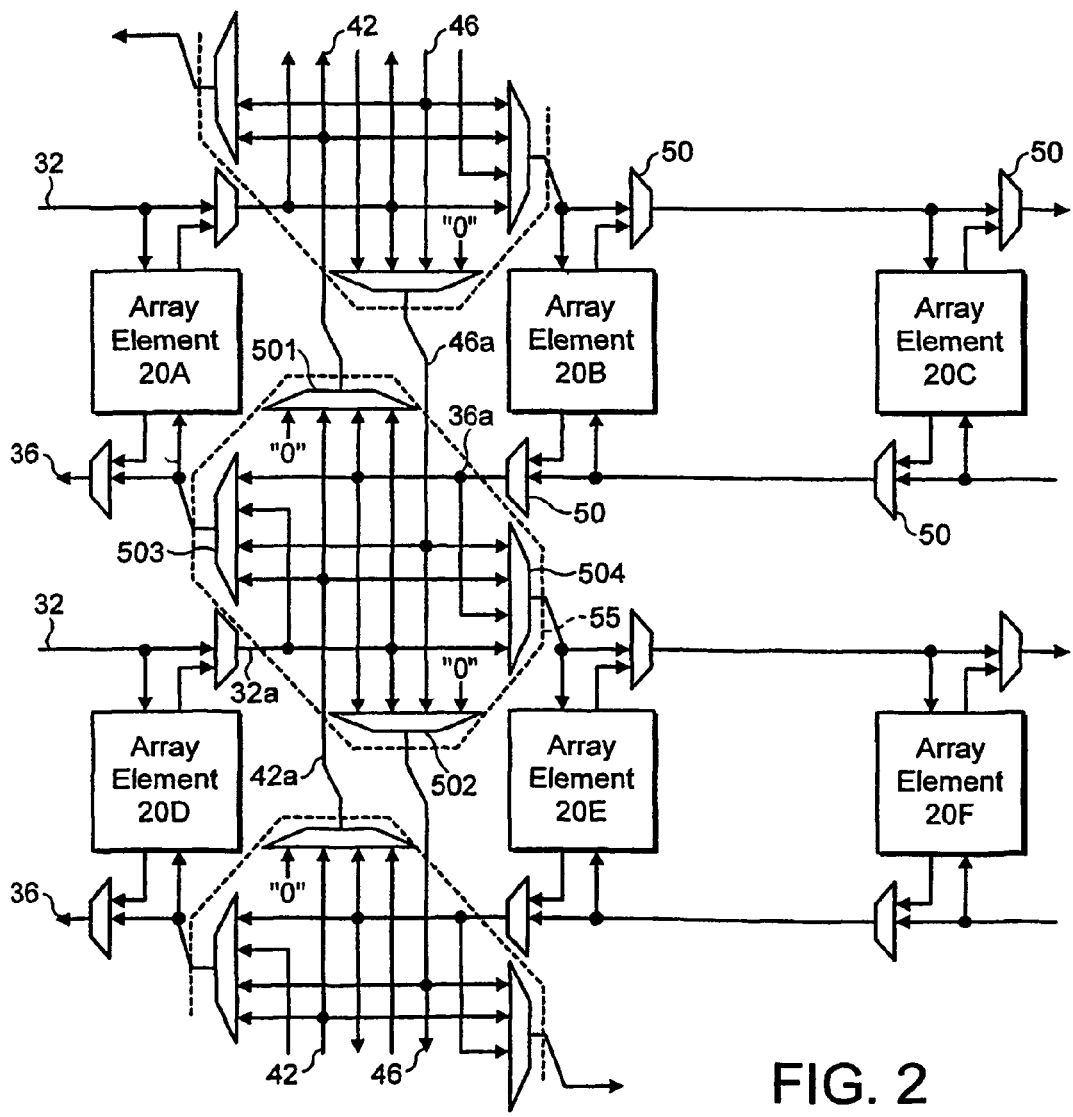
FIG. 2 is an enlarged representation of a part of the architecture of FIG. 1.

FIG. 2 is an enlarged view of a part of the architecture of FIG. 1, showing six array elements, 20A-20F. Each array element is connected onto two 64-bit buses, 32, 36, which carry data in opposite directions. After every four array elements (as shown in FIG. 1), the horizontal buses are connected to two vertical buses, 42, 46, one running up and the other down. The choice of bit-width and vertical bus pitch is not fundamental to the architecture, but these dimensions are presently preferred.

Each switch element 50 is a 2:1 multiplexer, controllable such that either of its two inputs can be made to appear on its output. Thus, output data from an array element can be transferred onto a bus, and/or data already on the bus can be allowed to pass.

The switch matrix 55 includes four 4:1 multiplexers 501, 502, 503 and 504 which are each controllable such that any one of their inputs can appear at their output.

The inputs of multiplexer 501 are connected to input connections 32a, 36a and 42a on buses 32, 36, 42 respectively, and to ground. The output of multiplexer 501 is connected to bus 42.

The inputs of multiplexer 502 are connected to input connections 32a, 36a and 46a on buses 32, 36, 46 respectively, and to ground. The output of multiplexer 502 is connected to bus 46.

The inputs of multiplexer 503 are connected to input connections 32a, 36a, 42a and 46a on buses 32, 36, 42 and 46 respectively. The output of multiplexer 503 is connected to bus 36.

The inputs of multiplexer 504 are connected to input connections 32a, 36a, 42a and 46a on buses 32, 36, 42 and 46 respectively. The output of multiplexer 504 is connected to bus 32.

Thus, in the switch matrix 55, the input of any bus can be used as the source for data on the output of any bus, except that it is not possible to select the down bus (i.e. the one entering from the top of the diagram in FIG. 2, namely the fourth bus 46) as the source for the up bus (that is, the third bus 42), and, similarly, it is not possible to select the up bus (the third bus 42) as the source of the down bus (the fourth bus 46).

These exceptions represent scenarios which are not useful in practice. Conversely, however, it is useful to have the left bus as a potential source for the right bus, and vice versa, for example when routing data from array element 20B to array element 20E.

As mentioned above, one of the inputs of each of the multiplexers 501, 502 is connected to ground. That is, each of the 64 bus lines is connected to the value 0. This is used as part of a power reduction method, which will be described further below.

Each of the multiplexers 501, 502, 503, 504 can be controlled by signals on two control lines. That is, a two-bit control signal can determine which of the four inputs to a multiplexer appears on its output.

Figure 3:
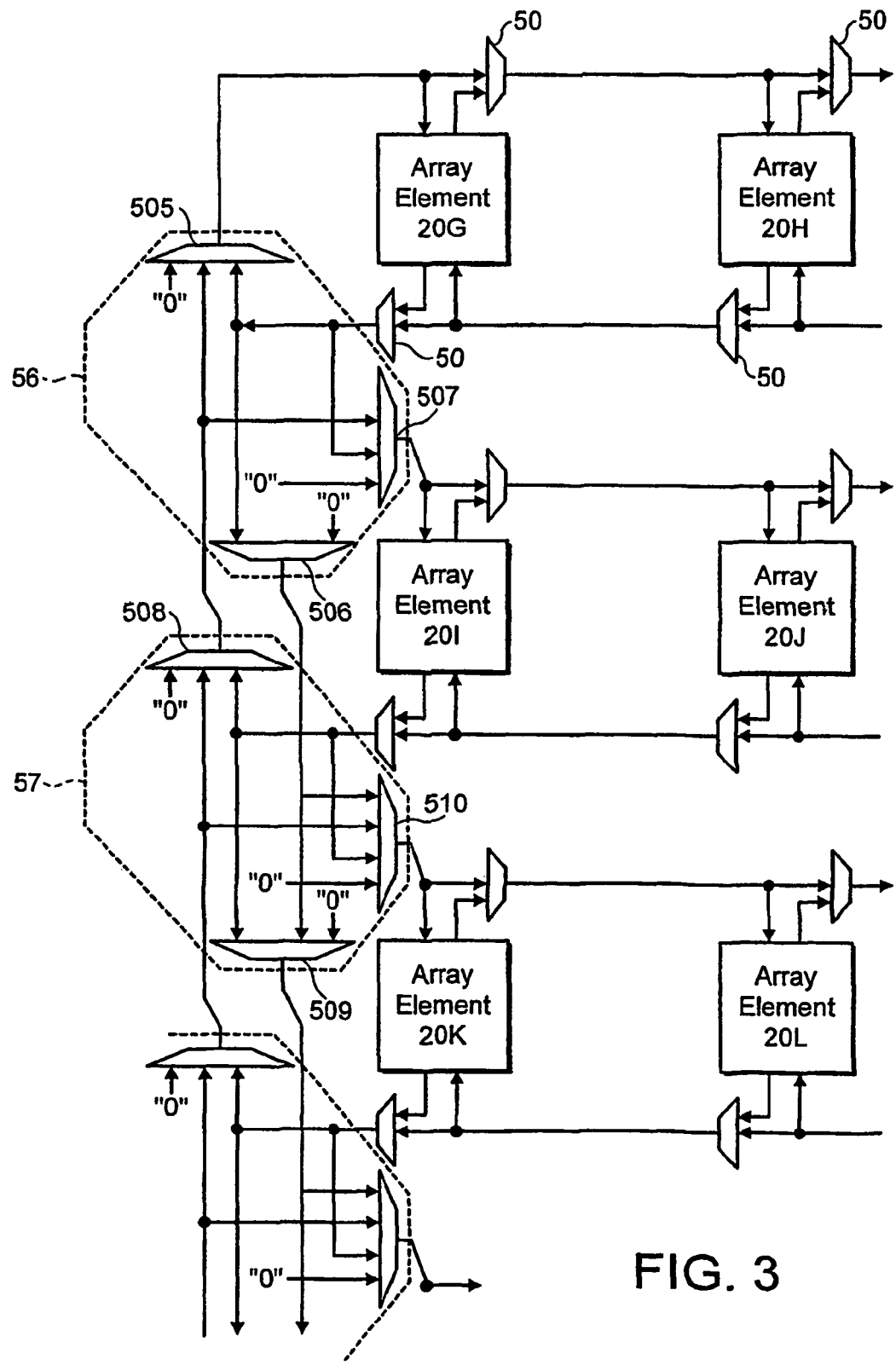
FIG. 3 is an enlarged representation of another part of the architecture of FIG. 1.

FIG. 3 is a view of the top-left hand corner of the array of FIG. 1, showing the structure of a switch matrix 56 which is used when there is no input connection to a left-right bus 32, and of a switch matrix 57 which is used when there is no input connection to a left-right bus 32 or to a bus 46 running down.

The switch matrix 56 includes three 4:1 multiplexers 505, 506, 507, while the switch matrix 57 includes three 4:1 multiplexers 508, 509, 510. Compared to a switch matrix in the middle of the array, the number of input buses to multiplexers 505, 508 and 509 is reduced by one, because there is no input bus entering from the left. Similarly, there is no input bus entering from the left as an input to multiplexer 510, but in this case the input bus which has been released has been connected to 0. This is also the case for multiplexer 507, but in this case there is no input bus entering from the top of the switch matrix either, so this multiplexer has only three input buses.

Being in the corner of the array, no input buses from the top or the left are available for multiplexer 506, which only has two inputs. Equivalent arrangements will be apparent for the bottom-left, top-right and bottom-right corners of the array.

Figure 4:
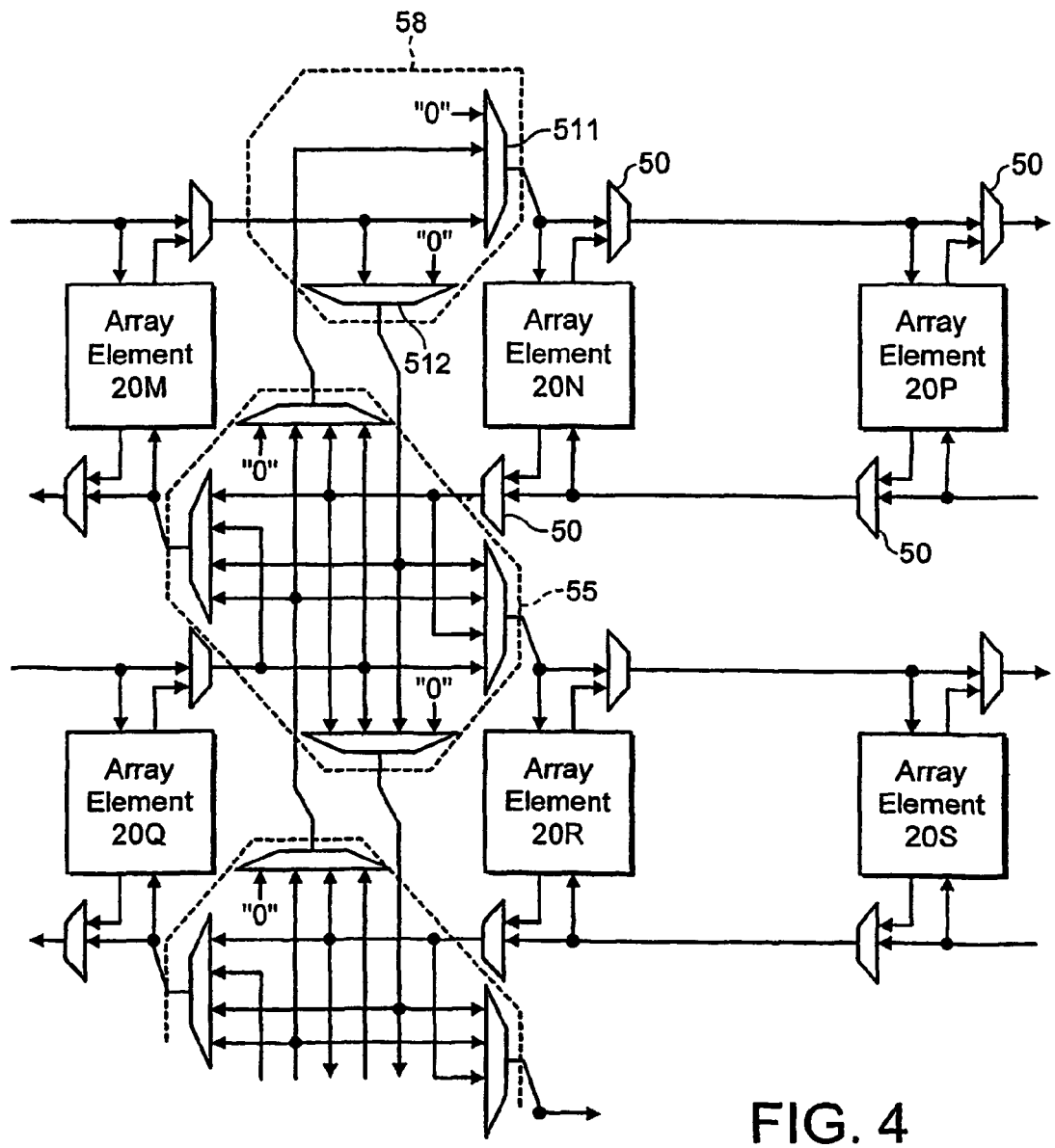
FIG. 4 is an enlarged representation of another part of the architecture of FIG. 1.

FIG. 4 is a view of part of the top edge of the array of FIG. 1, showing the structure of a switch matrix 58 which is used when there is no input connection to a bus 46 running down.

The switch matrix 58 includes two 4:1 multiplexers 511, 512. The number of available input buses to multiplexers 511 and 512 is reduced by two, but, in the case of multiplexer 511, one of the input buses has been replaced by the value zero. An equivalent structure for multiplexers on the bottom edge of the array is apparent.

Data transfer can be regarded as having three stages. Firstly, an array element puts the data on the appropriate output.

Secondly, multiplexers in the appropriate switch matrix, or switch matrices, are switched to make the necessary connections.

Thirdly, the destination array element loads the data.

Each of these aspects is controlled by a separate array element: the first and third by the source and destination array elements respectively, and the second by special switch control array elements. These are embedded into the array at regular intervals and are connected by control lines to all the multiplexers in the switch matrices which they control. Each array element controls the multiplexers immediately adjacent to its outputs, with the control being performed separately on individual 16-bit fields. This allows several array elements to source data onto a bus at the same time, provided they are using different fields of the bus. This is particularly useful for functions such as Add-Compare-Select (ACS) in the Viterbi Algorithm. Switching at intersection nodes of the horizontal and vertical buses is performed on the entire 64-bit bus and its associated control signals.

Clearly, the three operations of source, switching and loading, although controlled independently, need to be synchronised. This is achieved by restricting all data transfer operations to a series of predetermined cycles, which are fixed at the time when the program is compiled and mapped onto the array. In a general purpose processor, this restriction would be onerous, but it is actually helpful for many applications of the present invention.

As mentioned previously, there are a number of types of array element, but they all must conform to three basic rules.

Firstly, they must have input and output ports which connect to the left and right buses of the array.

Secondly, they must run a program which is synchronised to the transfer cycles on the buses to which they are connected.

In practice, this usually means that each array element must run a program loop which accesses the buses in a regular pattern which has a duration in clock cycles which is a power of two (e.g. 4, 8, 16 or 32 clock cycles).

Thirdly, they must interpret information which appears on the buses during special control cycles, known as the Array Control Protocol.

A consequence of these rules is that, in the normal course of events, the entire program which an array element executes will be contained in local memory within the array element. In fact, more often than not, the program will contain just one loop. It is possible to reload an array element with new instructions, but this involves stopping executing and reloading the instruction store of the array element using the control cycles outlined above. An array element has no means of fetching external instructions autonomously.

All array elements are data driven. That is to say, array elements only execute instructions of their programs when data arrives.

Figure 5:
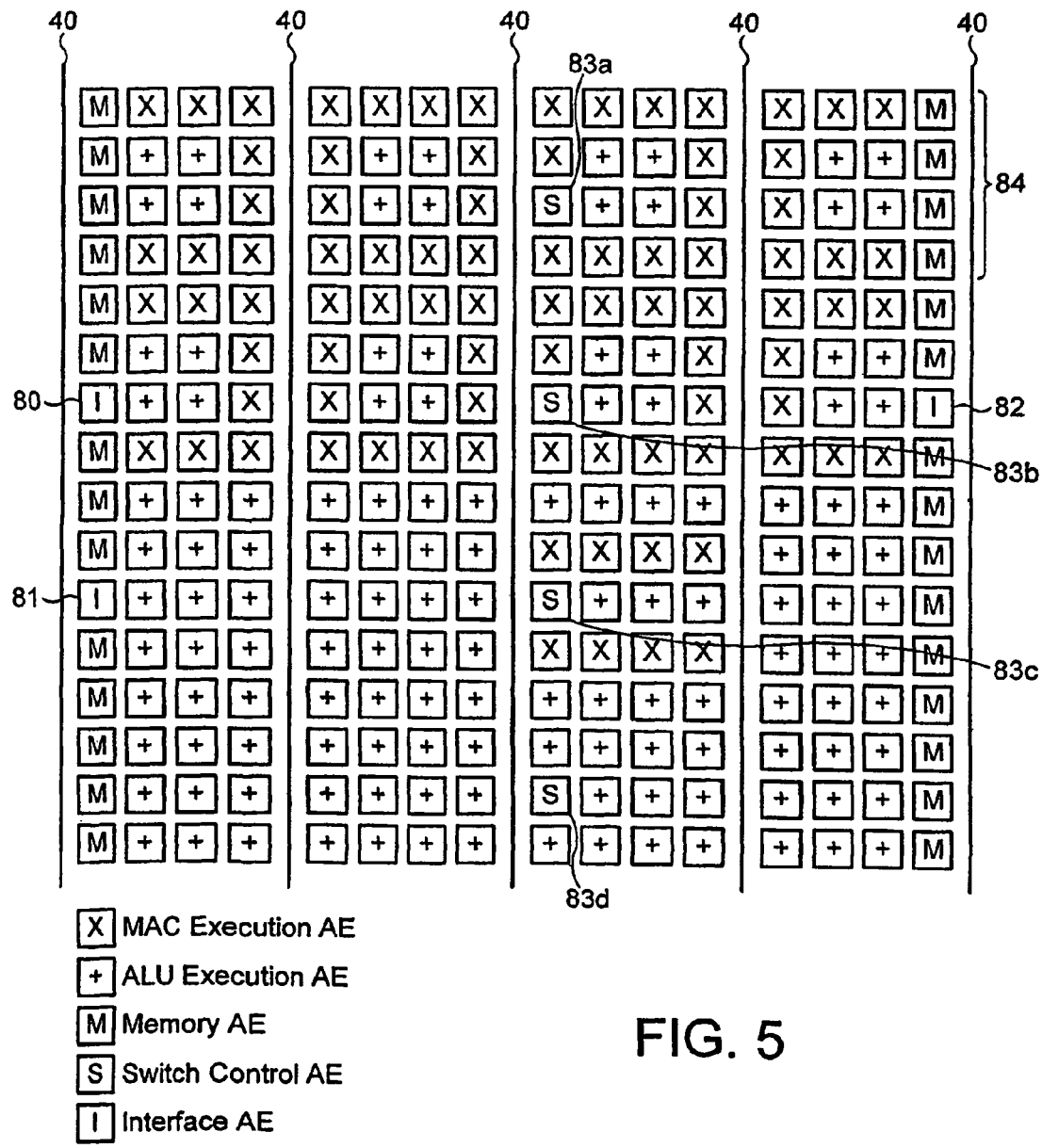
FIG. 5 shows the distribution of elements in a typical array in accordance with the invention.

There are two types of execution array elements: Multiplier Accumulator (MAC) array elements and Arithmetic Logic Unit (ALU) array elements. These must be included in the array along with other array elements in approximately the correct proportions for the target applications. Fortunately, many array applications require approximately the same proportions, and FIG. 5 shows an example of an array containing 256 array elements in proportions optimised for a communications transceiver. FIG. 5 does not show the horizontal buses in the array and the positions of pairs of vertical buses 40 are shown as single lines.

As well as MAC, ALU, Memory and Switch Control array elements, the example array of FIG. 5 contains three interface array elements, 80, 81 and 82. Array elements 80 and 81 are used for data input and output to the analogue portions of the transceiver and array element 82 is the interface to a microprocessor. Each of the four Switch Control array elements 83a to 83d controls the switch matrices of one quarter of the array. For example, Switch Control array element 83a controls the switch matrices along the horizontal buses connected to the top four rows of array elements, 84.

Figure 6:
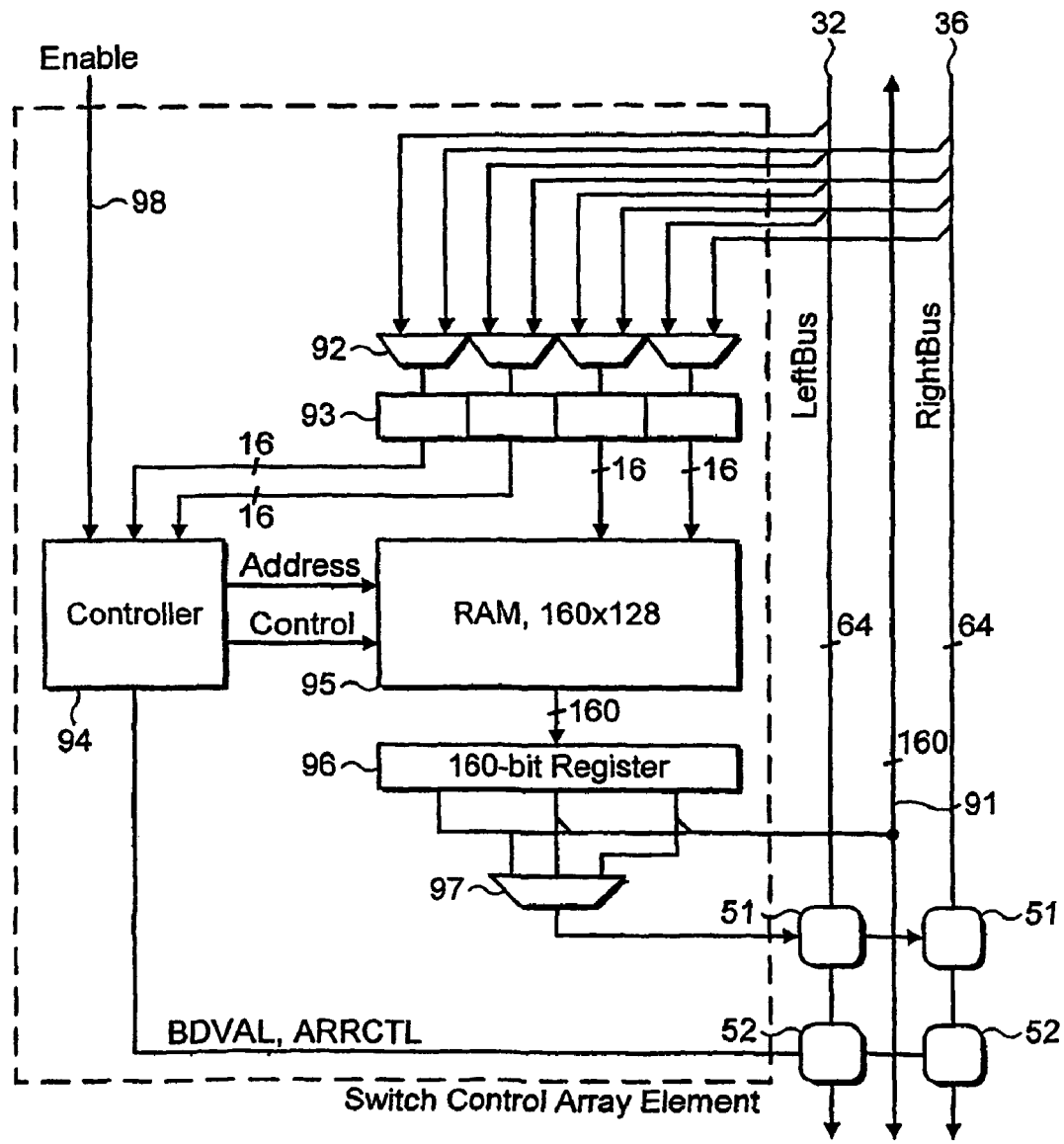
FIG. 6 shows a first array element in the architecture of FIG. 1.

FIG. 6 shows the preferred embodiment of a Switch Control array element. This consists of controller 94 and RAM 95, together with means of loading the RAM using the Array Control Protocol described below and sequencing data out of the RAM. Data is loaded into the RAM from either the left bus 32 or right bus 36 to which the Switch Control array element is connected by means of multiplexers 92 and 64-bit register 93.

When the Switch Control array element is set into its normal operating mode by means of Enable signal 98, the address of RAM 95 is first set to zero and the first 160-bit word is read out and loaded into register 96. On each subsequent clock cycle, the RAM address is incremented and a new 160-bit word is loaded into register 96, until the address reaches 127, at which point it is reset to zero again and the process is repeated. The outputs of register 96 are routed directly to the select inputs of the multiplexers in the switch matrices 55 (FIGS. 1 and 2), so in this way all the switch matrices are controlled in a cyclical pattern lasting for 128 clock cycles. The outputs of register 96 can also be directed onto the bus 32 or the bus 36 by means of a multiplexer 97 and switch boxes 51. As previously noted, most areas of the array transfer data in cyclical patterns of a duration less than 128 clock cycles, but these are accommodated by repeating them within the 128 cycle pattern.

Figure 7:
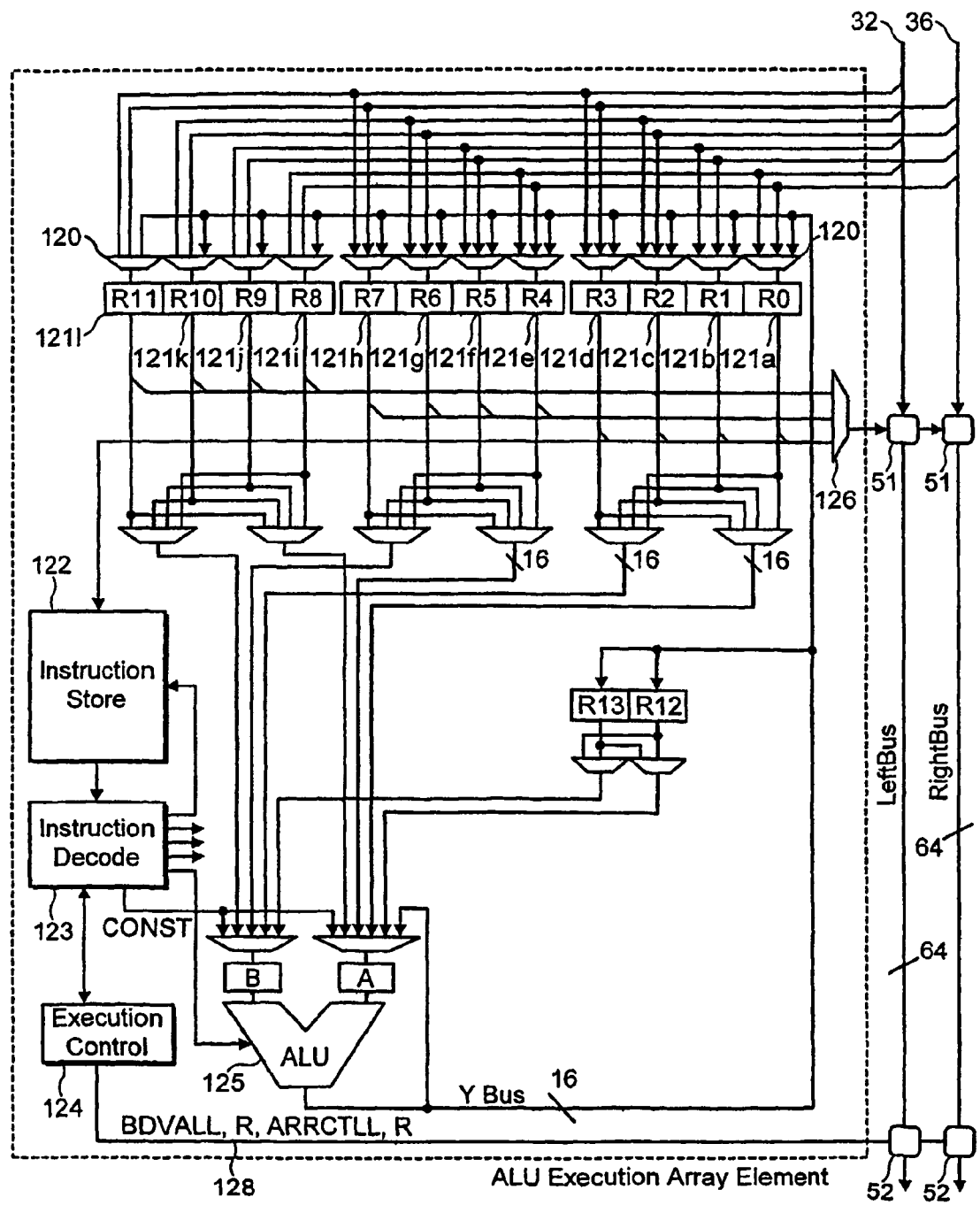
FIG. 7 shows a second array element in the architecture of FIG. 1.

ALU and MAC array elements have the same interfaces to the array, differing only in the type of execution unit and associated instructions. FIG. 7 shows an ALU array element, which will be used to describe these interfaces to the array.

Referring to FIG. 7, three 64-bit registers, each formed from four 16-bit sub-registers 121*a*-121*d*, 121*e*-121*h* and 121*i*-121*l*, can be connected to either of left bus 32 or right bus 36 through multiplexers 120, thus allowing them to be loaded from either bus. In response to instructions taken from instruction store 122 and decoded in instruction decode unit 123, any one 64-bit register can be connected to the left or right bus during one clock cycle and any combination of sub-registers loaded. For example, an instruction may cause 16-bit sub-registers 121*a* and 121*b* of 64-bit register 121*a*-121*d* to be loaded with the data in bits 31:0 of left bus 32. Further instructions may cause data in the registers to be manipulated in ALU 125 and stored back into the same or different registers 121, and still further instructions may enable the contents of these registers onto the left and right buses via multiplexer 126 and switch boxes 51. In the preferred embodiment, during the same clock cycle one 64-bit register may be used to load data from an array bus, data from another may be enabled back onto an array bus and ALU operations may be performed on the contents of registers, these tasks being accomplished by using separate fields in the instruction words.

Figure 8:
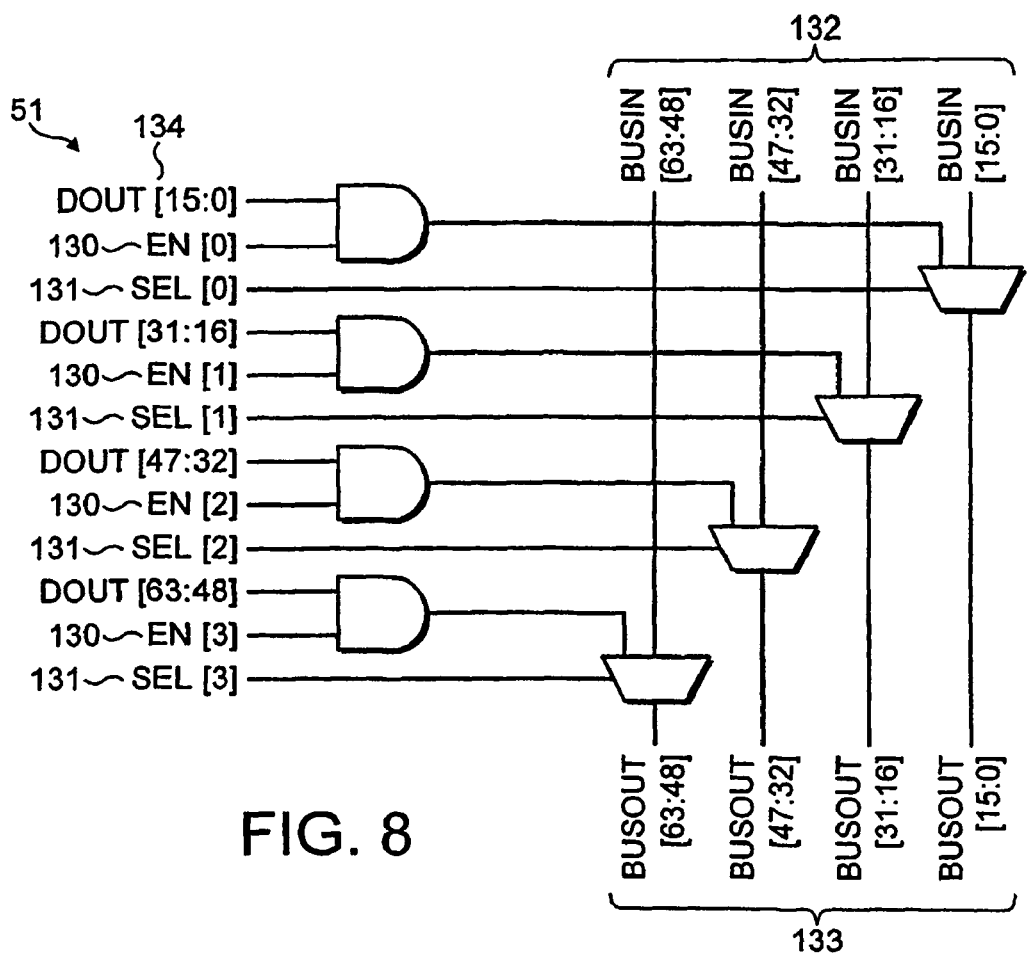
FIG. 8 shows a first connection of the array element of FIG. 7 in the array according to the invention.

FIG. 8 shows the contents of a switch box 51 in FIG. 7. BUSIN 132 and BUSOUT 133 are each segments of a left bus 36 or a right bus 32. Control signals EN[3:0] 130 and SEL[3:0] 131 are both sourced by instruction decode block 123 in FIG. 7. Using these signals, any 16-bit field of BUSOUT may be set to be equal to BUSIN, the output bus of the array element or zero.

Figure 9:
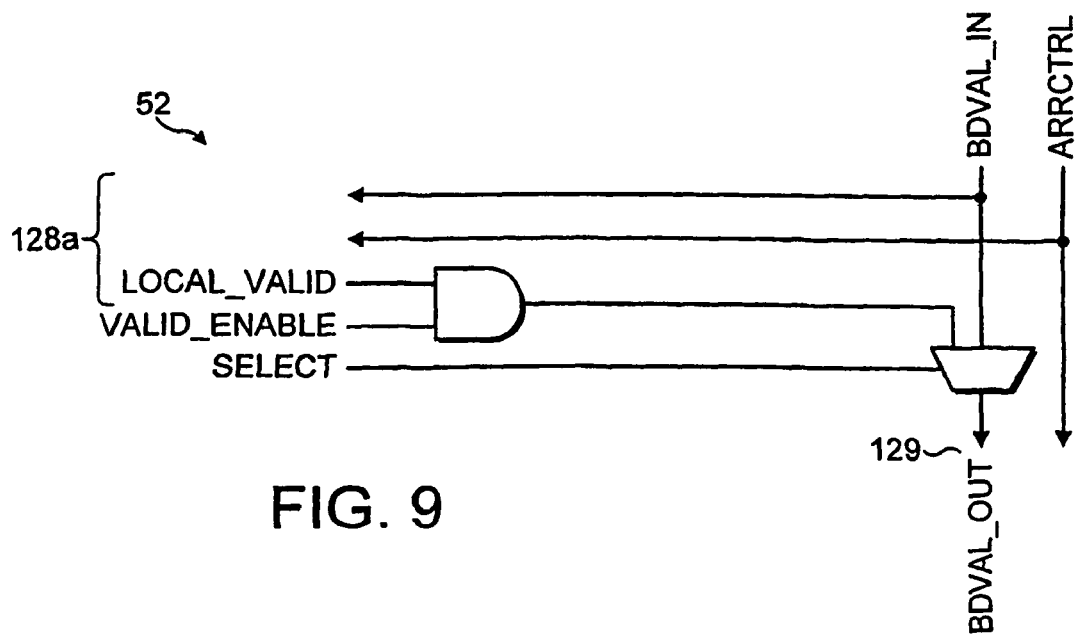
FIG. 9 shows a second connection of the array element of FIG. 7 in the array according to the invention.

FIG. 9 illustrates how, likewise, the BDVAL signal (described below) associated with the data on the bus can be allowed to pass along the bus or be set by the array element.

Figure 10:
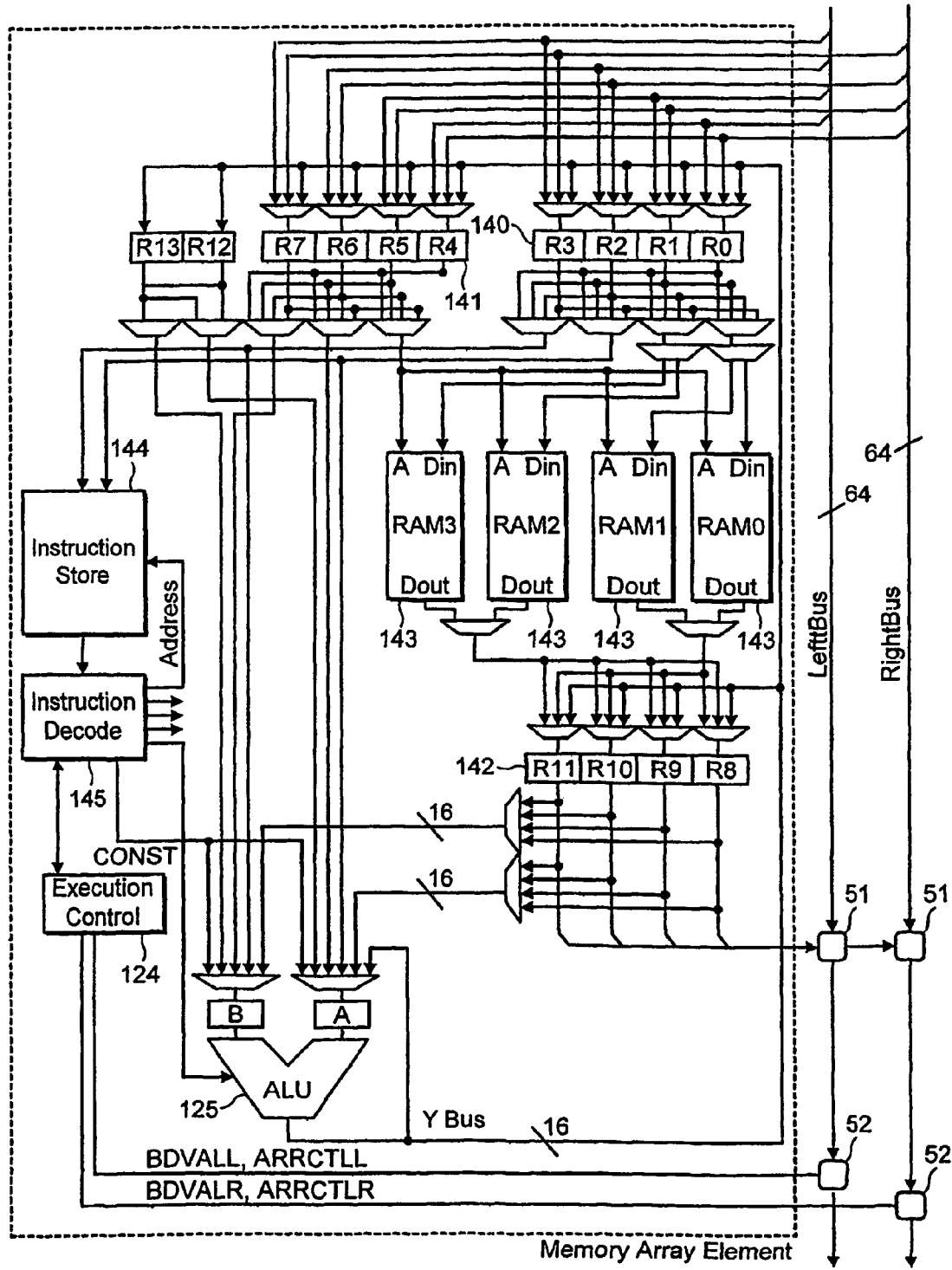
FIG. 10 shows a third array element in the architecture of FIG. 1.

FIG. 10 shows the preferred embodiment of a Memory array element. This has many of the same features of the ALU array element described above, but in addition has RAMs 143 connected to registers 140, 141 and 142 via multiplexers. 16-bit sub-registers R0 to R3 of 64-bit register 140 are used for data input to the RAMs, 16-bit sub-registers R4 to R7 of 64-bit register 141 are used for the address input to the RAMs and 16-bit sub-registers R8 to R11 of 64-bit register 142 are used for the data output from the RAMs. Both address and data may be manipulated using the ALU under the control of the instruction decode unit as in the case of the ALU array element and the processes of loading data from the left and right buses 32 and 36 is also performed in exactly the same manner. The instructions stored in instruction store 144 and decoded in instruction decode unit 145 have an additional field compared to the equivalent units of the ALU array element. This additional field is used to control the reading of data from the RAMs and writing of data to them, these operations being performed in the same cycles as array accesses and ALU operations.

Referring to FIG. 10, it can be seen that the addresses for the RAMs may be calculated within the Memory array element using its internal ALU and loaded into the sub-registers of 64-bit register 141. Alternatively, addresses may be provided over the array buses from another array element and loaded directly into register 141.

In the example array of FIG. 5, Memory array elements hold all the data which is processed by the execution array elements and there is no external global memory. However, it will be clear that if a given application requires a large amount of storage, access to external memory can be provided using appropriate Interface array elements. Furthermore, instructions which form the programs which the array elements run are not generally stored in Memory array elements, but reside entirely in the instruction stores of the array elements. Instructions are loaded into the instruction stores of the array elements using the Array Control Protocol, which is described below.

Figures 11, 12:
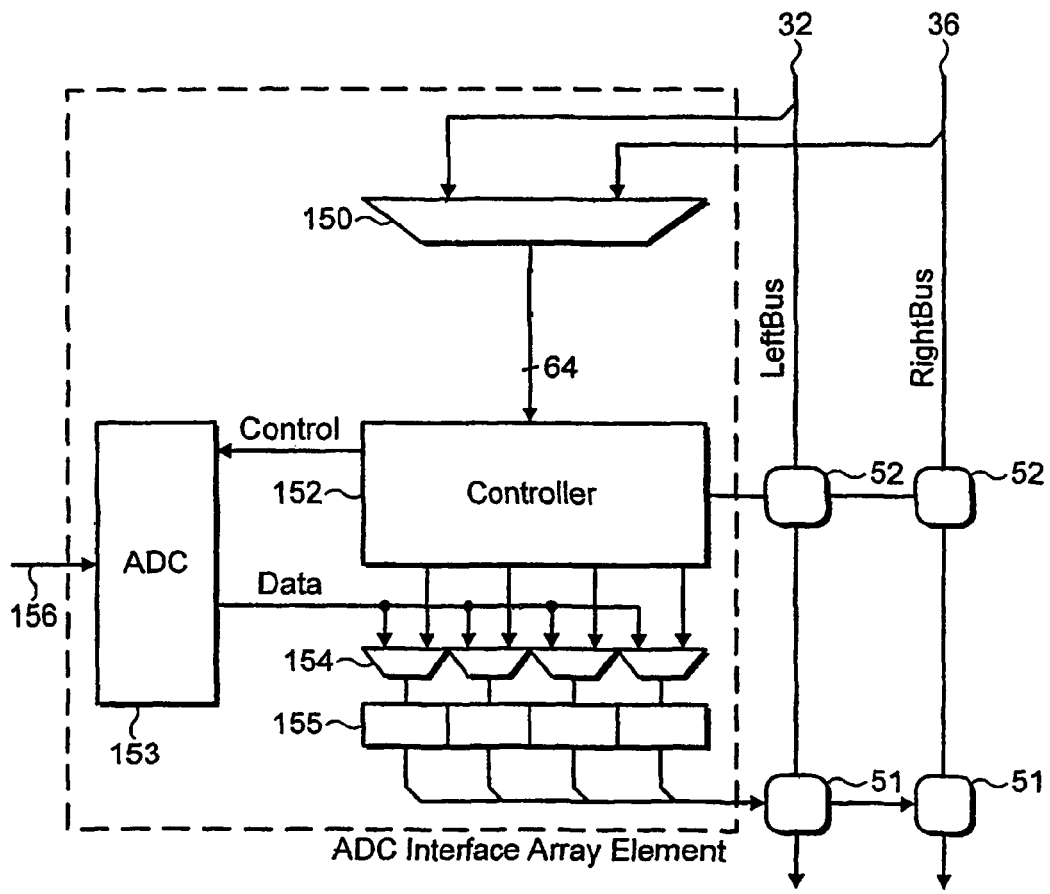
FIG. 11 shows a fourth array element in the architecture of FIG. 1.
FIG. 12 shows the format of data transferred between array elements.

FIG. 11 shows how an Analogue to Digital Converter (ADC) 153 can be connected to the processor architecture as an Interface array element.

Because an ADC solely sources data, the only need to supply data to this array element, thorough a multiplexer 150, is for the purposes of configuration and control, such as putting the ADC into test or low power standby modes, and to control the times at which the array element transfers sampled data onto the output bus. The array element controller 152 can therefore be simpler than the instruction store and decode unit in Execution and Memory array elements, but nevertheless is capable of being programmed to cause ADC 153 to sample input analogue signal 156, load the sampled data into register 155 through multiplexers 154 and enable this data onto bus 32 or 36 at configurable points in a sequence.

Other common sorts of Interface array element are the Digital to Analogue Converters (DAC) array element, which performs the opposite role of the ADC array element, and the host interface array element. The latter transfers data from the array to the bus of a general purpose host processor and from the host processor to the array.

The basic elements of the array architecture according to the present invention have now been described. However, much of the power of the architecture comes from the details of operation, and in particular how it has been optimised to support common computation-intensive DSP algorithms found in physical layer protocols. More details of these aspects will now be provided, together with the methods used to minimise power dissipation, which allow the architecture to be used in power-sensitive devices, such as handheld terminals.

A number of control signals are multiplexed with the 64-bit data buses in the array, namely:

ARRCTL—ARRay ConTroL—This signifies that the data on the bus is array control information. All array elements must interpret this and act accordingly.

BDVAL—Bus Data VALid—This signifies that there is valid data on the bus. This is a key signal in the control of power dissipation.

A major objective of the architecture is to keep the size of array elements down by eliminating the need for complex control overheads. The Array Control Protocol (ACP) is used for the following:—

Loading the program code into all array elements when the array is booted.

Starting, stopping and synchronising array elements.

Selectively reloading new program code into array elements during operation.

Each array element has a Unique Identifier (UID), which is used to address it, and the ACP uses Array Control Words (ACW's) to communicate information between array elements. When the ARRCTL line of a section of a bus is high, it indicates that the data on the bus is an ACW. FIG. 12 shows the structure of the 64-bit ACW.

When an ACW is put on the section of the bus to which an array element is connected, the array element must examine the word, even if it was formerly in low-power sleep mode. If the address field of the ACW matches the UID of the array element, or is equal to a designated broadcast address, the array element must interpret the FUNCTION field of the ACW and perform the required action. In one presently preferred embodiment of the invention, the following FUNCTION fields are defined:

| Value | Function | Description |
|---|---|---|
| 0 | Reset | Causes the array element to halt operation and resets its internal state |
| 1 | Load Program 0 | The DATA field contains a program word which must be placed in the first location in the program store of the array element |
| 11 | Load Program | The DATA field contains a program word which must be placed in the next location in the program store of the array element |
| 100 | Start | The array element must start executing program in program store |
| 101 | Stop | The array element must stop executing program in program store |
| 110 | Test | Enter test mode |
| 111 | Dump | Place data from next location in the program store on the bus |

ACWs may be generated by any array element, but the array will normally include one element which is defined as the master controller, and the master controller will generate all ACWs. The major function of the Array Control Protocol is to load the program stores of the array elements when the device is booted. Therefore, a host interface array element, which loads the program supplied by a host processor, is most likely to be the source of ACWs.

Unlike most processors, which are instruction driven, the processor of the present invention, and its component array elements, are data driven. That is, instead of processing data as the result of fetching an instruction, array elements execute instructions as a result of receiving data.

Once a program has been loaded into an array element and it has been started using the START Array Control Word it will begin to execute its instruction sequence. When it reaches an instruction which requires it to load data, then, if no data is present on the bus (signified by the control signal BDVAL being low) it must stop and wait until data is available. During the time it is stopped it puts itself into a low power sleep mode. Whilst in sleep mode, the array element will examine the bus at time intervals specified by a field in the load instruction which was stalled to check if the data has arrived.

For example, consider a demodulator. In a demodulator using the architecture described herein, the demodulator will contain an ADC which samples at a fixed rate which generally will be somewhat above the actual required rate. The front end of the demodulator will contain an interpolator, which resamples the incoming data. This removes the need for an analogue VCO to synchronise the ADC sample clock to the data, but the resampled data will be irregular with respect to the processor system clock and data transfer sequences, creating "gaps" where data would have been expected. (In fact the ADC sample clock need not be synchronised to the processor system clock at all, with synchronisation to the system clock being performed in the ADC interface array element). Using the data driven processor architecture of the present invention, where there is a "gap" in the incoming data, the array elements which are affected merely "go to sleep" until data is available.

It should be noted that, because all data transfers are synchronised to sequences which are defined at the time the program is compiled and mapped to the processor, array elements will sleep for at least one of the sequences to which they are synchronised.

Figure 13:
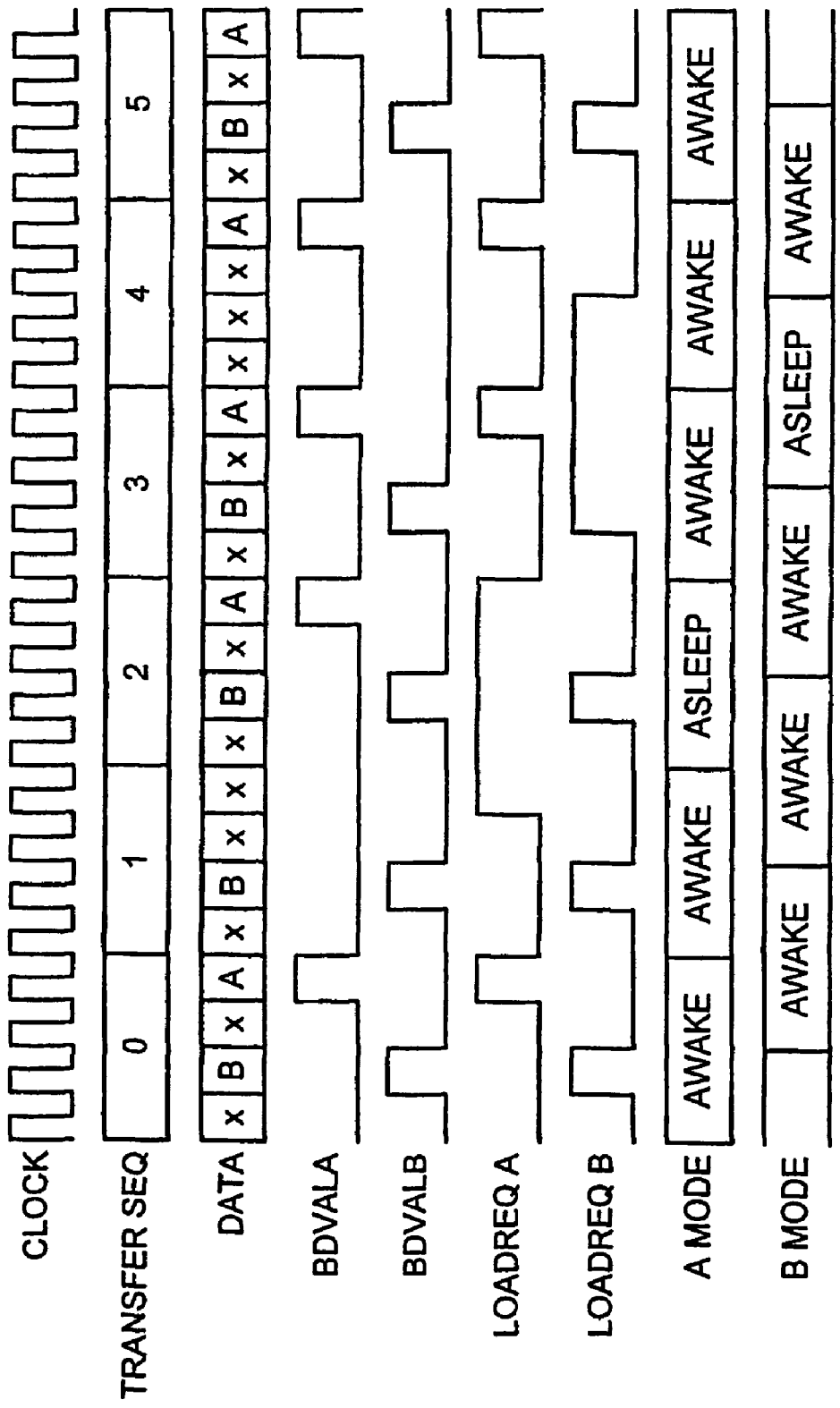
FIG. 13 is a timing diagram illustrating the flow of data between array elements.

This is illustrated in FIG. 13. In this timing diagram, all transfers to two array elements (A and B) are synchronised to a four cycle sequence. Successive transfer sequences are labelled 0 to 5 (TRANSFER SEQ). In the sequence, array element A loads data on the fourth clock cycle and array element B on the second (as shown in the DATA bus), the points at which they load being shown for convenience as the signals LOADREQA and LOADREQB. Signals BDVALA and BDVALB are the BDVAL signals associated with the data loaded by array elements A and B. It can be seen that, where no data is available when it is expected, that is the BDVAL signal is low, as is the case in sequence 1 in which there is no data for array element A and in sequence 4 in which there is no data for array element B, the respective array element goes into sleep mode until the data is available. Also, the fact that no data is available for one of the array elements does not affect transfer operations to the other.

Clearly, if an array element does not receive any data, there will be a corresponding gap when it does not source data, so gaps will ripple through the array. However, the approximate gap rate at any particular point in the algorithm will be known at the time the program is written, so careful use of FIFO's (which tend to occur naturally at points in an algorithm where data needs to be stored, for example where a block of data has to be accumulated before it is processed) means that the entire array is not locked to gaps which occur at the front end of the processing chain.

In some cases, when a particular array element does not receive data, a small group of array elements must be stalled. For example, if an array element multiplies data with coefficients which are loaded from a memory array element, then, if the data does not arrive, the memory array element must be prevented from sending data. This is achieved by routing the data past the memory array element and allowing the memory array element to sample the BDVAL signal. If BDVAL is low, then the memory array element will also go into sleep mode.

In more detail, the method by which the BDVAL signal is controlled and array elements respond to it is as follows.

Consider the ALU array element of FIG. 7. Every time this array element executes a STORE instruction, which causes it to enable data onto an array bus, it sets the LOCAL_VALID, VALID_ENABLE and SELECT signals (128a in FIG. 9) for one of switch boxes 52 such that BDVAL_OUT (129 in FIG. 9) is set to 1 for one clock cycle. During the same clock cycle, EN[3:0] 130 and SEL[3:0] 131 in FIG. 8 are set so as to set BUSOUT[63:0] to the required value. For example, if data is to be transferred on all 64 bits of the bus, then all of EN[3] to EN[0] and SEL[3] to SEL[0] are set to 1. If, however, data is only to be transferred on bits [15:0] of the bus, then EN[0] and SEL[0] are set to 1, but EN[3:1] are set to 0. SEL[3:1] are set to 1 if no other array element is transferring data on the other bits of the bus segment during the same clock cycle. Otherwise, they are set to 0. As an example of multiple array elements using the same bus segment to transfer data in the same clock cycle, referring to FIG. 2, using the above method, it can be seen that array element 20B could transfer data onto bits [31:0] of bus 36, whilst array element 20C transfers data on bits [63:32], with all 64 bits being routed to array element 20F, say.

During the clock cycle referred to above, the Switch Control array elements cause multiplexers in switch matrices 55 (FIGS. 1 and 2) to switch so that the bus data and the associated BDVAL signal are routed to the destination array element. Referring again to FIG. 7, during the same clock cycle, the destination array element (or array elements) executes a LOAD instruction which causes multiplexers 120 to select the bus on the inputs of the required register 121, which is loaded at the end of the clock cycle if the BDVAL signal is 1. If the BDVAL signal is 0, no load takes place and the array element waits for a number of clock cycles specified as part of the LOAD instruction field. During the time that the destination array element is waiting, the only active circuitry in the array element is the execution control block 124, which loads the wait period into a counter and counts down. When the count reaches zero, the execution control unit re-examines the BDVAL signal and, if it is now 1, causes execution to proceed from the point it left off. Because the circuitry in the execution control unit is very small compared to the rest of the array element, very little power is consumed while an array element is waiting.

As well as the LOAD instruction described above, all array elements which can be destinations for data transfers also have a WAIT instruction. This instruction causes the execution control unit to examine the BDVAL signal for either left bus 32 or right bus 36 and wait for the specified number of clock cycles if selected BDVAL signal is 0. However, no data is loaded.

Throughout the above descriptions, reference has been made to methods of reducing power dissipation in the array. These methods are now described in more detail.

In order to minimise power dissipation during data transfers on the array, it is important that bus lines and other signals are not charged and discharged unless necessary. In order to achieve this, the default state of all bus lines has been chosen to be 0, and the Switch Control array elements are programmed to select the value of 0 onto all bus segments that are not being used via the "0" inputs of multiplexers 501 and 502 in FIG. 2 and additional multiplexer inputs at the edges and corners of the array as shown in FIGS. 3 and 4.

When data is transferred on the bus, often not all 64 bits are used. Therefore a method is provided, as described above, whereby the array element which is loading data onto the bus sets any unused bits to 0. If the bus had previously been inactive, these bits would have been 0 before the start of the transfer, so their values will not change.

Referring to FIG. 2, it will be seen that, if data is being transferred from array element 20B to array element 20E, say, then, unless any further measures were provided, the data would propagate along right bus 32 which is connected to array element 20E, past array element 20E and on to array element 20F and beyond, thus unnecessarily charging or discharging further segments of bus 32. To prevent this from occurring, all array elements which can be destinations for data can cause the signals for their output switch boxes 51 to be set so that data further along the bus is set to 0 (and hence remains at zero). This is achieved by setting signals EN[3:0] (130 in FIG. 8) to 0 and signals SEL[3:0] (131 in FIG. 8) to 1. A field is provided in the LOAD instruction which is executed on an array element which selects whether data is allowed to propagate further along the bus or is stopped as just described, thus allowing multiple array elements to load the same-data (or different fields of the bus which are transferred during the same clock cycle).

There is therefore described a processor architecture which can be reprogrammed to provide a required functionality, while being efficient in terms of its power consumption and occupied silicon area.

The invention claimed is:

1. A processor architecture, comprising:
   a plurality of elements arranged in an array comprising rows and columns;
   a plurality of first bus pairs, each first bus pair being located between different adjacent rows of the array and including a respective first bus running in a first direction and a respective second bus running in a second direction opposite to the first direction; and
   a plurality of second bus pairs, each second bus pair being located between different adjacent columns of the array and including a respective third bus running in a third direction and a respective fourth bus running in a fourth direction opposite to the third direction, the third and fourth buses intersecting the first and second buses;
   wherein each element of the array, which is not at an edge row of the array, is configured so as to be able to receive data from a respective first bus of said bus pairs and from a respective second bus of a different one of said bus pairs, and is configured so as to be able to transfer data to said respective first bus of one of said bus pairs and to said respective second bus of said different one of said bus pairs and further comprising
   a plurality of switch matrices, each switch matrix being located at an intersection of one of said first bus pairs and one of said second bus pairs, configured to have inputs for each of said first, second, third and fourth buses and outputs for each of said first, second, third and fourth buses and switch elements for switchably connecting said inputs to said outputs.

2. A processor architecture as claimed in claim 1, wherein the elements in the array include processing elements, for operating on received data.

3. A processor architecture as claimed in claim 2, wherein the processing elements include Arithmetic Logic Units.

4. A processor architecture as claimed in claim 2, wherein the processing elements include Multiplier Accumulators.

5. A processor architecture as claimed in claim 1, wherein the elements in the array include memory elements, for storing received data.

6. A processor architecture as claimed in claim 1, wherein the elements in the array include processing elements, for operating on received data, and memory elements, for storing received data.

7. A processor architecture as claimed in claim 1, wherein the elements in the array further include interface elements for receiving input data from outside the processor, and transferring output data outside the processor.

8. A processor architecture as claimed in claim 1, wherein each element of the array, which is not at the edge row of the array, is connected between said respective first bus of one first bus pair and said respective second bus of an adjacent first bus pair.

9. A processor architecture as claimed in claim 1, each said element of the array having:
   a first input for receiving data from said respective first bus of the one first bus pair;

a first output for transferring data to said respective first bus of the one first bus pair;

a second input for receiving data from said respective second bus of the adjacent first bus pair;

a second output for transferring data to said respective second bus of the adjacent first bus pair.

10. A processor architecture as claimed in claim 9, further comprising:

a first switch connected to the first output of each said element of the array, the first switch allowing either data on the first bus or data at the first output of the element of the array to pass along the first bus, and a second switch connected to the second output of each said element of the array, the second switch allowing either data on the second bus or data at the second output of the element of the array to pass along the second bus.

11. A processor architecture as claimed in claim 10, wherein each first switch, connected to the first output of a respective element of the array, and each second switch, connected to the second output of the respective element of the array, are controlled by the respective element of the array.

12. A processor architecture as claimed in claim 11, wherein the means for controlling each switch matrix comprises an array element.

13. A processor architecture as claimed in claim 1, wherein each switch matrix allows data on a bus of a first bus pair to be switched onto the other bus of said first bus pair and/or onto either bus or both buses of the respective intersecting second bus pair, and allows data on a bus of a second bus pair to be switched onto either bus or both buses of the respective intersecting first bus pair, but not onto the other bus of said second bus pair.

14. A processor architecture as claimed in claim 13, further comprising means for controlling each switch matrix.

15. A processor architecture as claimed in claim 1, having a plurality of array elements connected to each bus of a first bus pair between each pair of adjacent switch matrices.

16. A processor architecture as claimed in claim 15, having four array elements connected to each bus of a first bus pair between each pair of adjacent switch matrices.

17. A processor architecture as claimed in claim 1, wherein:

said inputs and outputs of said switch matrices comprise input and output connections for the respective first, second, third and fourth buses; and said switch elements comprise four multiplexers, which are each controllable such that anyone of their inputs can appear at their output, wherein a first multiplexer has inputs connected to input connections on first, second and third buses and an output connected to the third bus, a second multiplexer has inputs connected to input connections on first, second and fourth buses and an output connected to the fourth bus, a third multiplexer has inputs connected to input connections on first, second, third and fourth buses and an output connected to the first bus, and a fourth multiplexer has inputs connected to input connections on first second, third and fourth buses and an output connected to the second bus.

18. A processor architecture as claimed in claim 17, wherein the first, second, third and fourth multiplexers are 4:1 multiplexers, and the first and second multiplexers each have respective inputs which are held at zero.

19. A processor architecture as claimed in claim 1 wherein said switch matrices are configured such that any data received at an input of the switch matrix which is passed to an output of the switch matrix is passed without modification.

20. A processor architecture as claimed in claim 1 wherein said switch matrices solely comprise switch elements and connections to buses.

21. A processor architecture as claimed in claim 1 wherein said array elements are configured to be data driven such that array elements only execute instructions of their programs when data arrives.

22. A processor architecture as claimed in claim 1 wherein the switch matrices are configured to be switched in a cycle to make temporal data transfer connections between said elements, said data transfer connections being fixed when a program is mapped to the processor architecture.

23. A processor architecture as claimed in claim 1 further comprising:

a top row bus running along the top row of the array in the same direction as the first buses of the first bus pairs;

a bottom row bus running along the bottom row of the array in the same direction as the second buses of the first bus pairs; wherein array elements of the top row of the array are configured so as to be able to transfer data to and receive data from said top row bus and also a second bus of one of said first bus pairs;

array elements of the bottom row of the array are configured so as to be able to transfer data to and receive data from said bottom row bus and also a first bus of one of said first bus pairs; further comprising additional switch matrices arranged to connect said top row bus to said second bus pairs and to connect said bottom row bus to said second bus pairs.

24. A processor architecture as claimed in claim 23 further comprising:

an edge column bus pair running along an edge column of the array and comprising a bus running in said third direction and a bus running in said fourth direction; and further additional switch matrices connecting said edge column bus pair to said first bus pairs.

25. A processor architecture comprising:

a plurality of elements arranged in an array comprising rows and columns;

a plurality of first buses adjacent to the rows of the array and running in a first direction of the array;

a plurality of second buses adjacent to the rows of the array and running in a second direction opposite to the first direction;

a plurality of third buses adjacent to the columns of the array and running in a third direction;

a plurality of fourth buses adjacent to the columns of the array and running in a fourth direction opposite to the third direction;

wherein each element of the array is configured so as to be able to receive data from, and transfer data to, respective first and second buses, wherein said array element is located between said first and second buses; and a plurality of switch matrices, each switch matrix being located at an intersection of one of said first and/or second buses and one of said third and/or fourth buses, wherein the processor architecture is configured such that the switch matrices are switched in a cyclical pattern to provide transfer cycles on the buses and wherein the array elements are synchronised to said transfer cycles.

* * * * *